Figure 1:
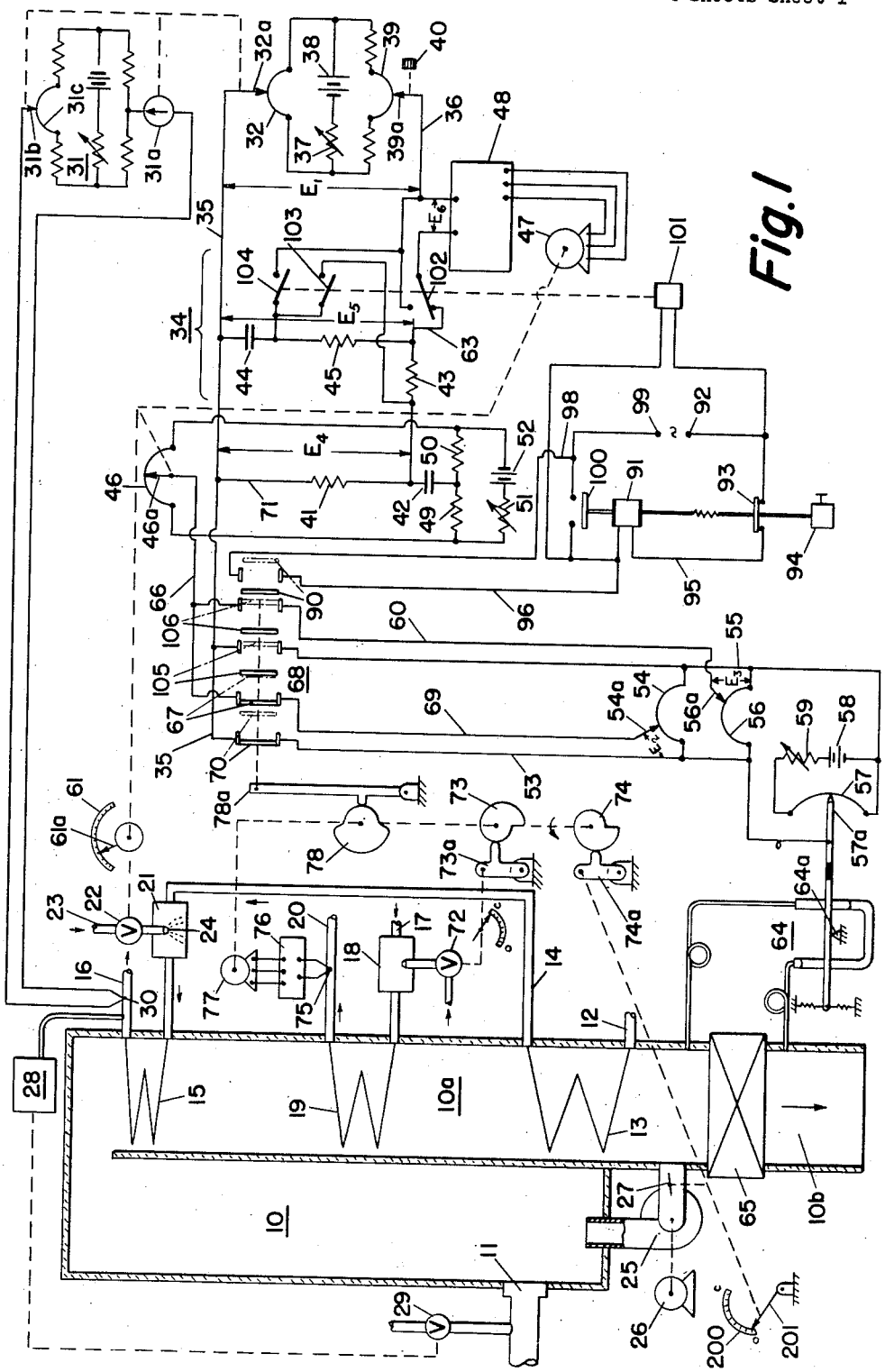

Sept. 10, 1957  E. S. BRISTOL  2,806,192
AUTOMATIC CONTROL SYSTEM WITH DISCONTINUOUS RELATIONSHIP
Filed July 7, 1953  4 Sheets-Sheet 1

Sept. 10, 1957            E. S. BRISTOL            2,806,192

AUTOMATIC CONTROL SYSTEM WITH DISCONTINUOUS RELATIONSHIP

Filed July 7, 1953            4 Sheets-Sheet 2

Sept. 10, 1957

E. S. BRISTOL 2,806,192

AUTOMATIC CONTROL SYSTEM WITH DISCONTINUOUS RELATIONSHIP

Filed July 7, 1953

4 Sheets-Sheet 3

United States Patent Office 2,806,192
Patented Sept. 10, 1957

2,806,192

AUTOMATIC CONTROL SYSTEM WITH DISCONTINUOUS RELATIONSHIP

Edward S. Bristol, Philadelphia, Pa., assignor to Leeds and Northrup Company, Philadelphia, Pa., a corporation of Pennsylvania Application July 7, 1953, Serial No. 366,418

16 Claims. (Cl. 318—29)

This invention relates to control systems of the type which automatically maintain at a predetermined value the magnitude of a controlled variable, and has for an object the provision of a method of and means for abruptly changing the nature of the automatic control operation without upsetting or introducing abrupt changes in the manipulated variable unrelated to deviation of the controlled variable from the control point.

In many systems where it is desired to maintain the magnitude of a condition (generically referred to herein as the controlled variable) at a selected or predetermined value (referred to as the control point), it has been found desirable to change in predetermined manner the functional relationship between the operation of devices regulating the magnitude of a manipulated variable and a control signal developed upon deviation of the controlled variable from the control point without abrupt change in the position of such devices.

In carrying out the invention there is provided an automatic control system for maintaining the magnitude of a condition at a predetermined control point including condition varying means and means responsive to deviation of the condition from the control point for automatically operating the condition varying means in accordance with a predetermined functional relationship. The control system also includes means for automatically changing the functional relationship and means operable during the change to prevent operation of the condition varying means. There is further provided in the system means for conditioning the system to accommodate the change in functional relationship in avoidance of any operation of the condition varying means immediately associated with the change in functional relationship.

More particularly in carrying out the invention in one form thereof there is provided a control system which is normally balanced with the controlled variable at the control point and which is unbalanced by a control signal whose magnitude changes in predetermined relationship with deviation of said controlled variable from the control point. To establish improved control of the controlled variable, in a process subject to change in characteristics the invention provides for changing the foregoing relationship as by abruptly changing the magnitude of the control signal. Such abrupt change, however, does not upset the control system as a whole for the reason that the manipulated variable is temporarily maintained at its existing value during the period required to effect abrupt change in the control signal. During the aforesaid period, the abruptly changed control signal is then applied to the control system in a manner to produce temporary balance thereof. When such temporary balance or equilibrium has been established, the manipulated variable is again placed under the control of the control system.

In one embodiment of the invention there is utilized a normally balanced electrical network having circuit components including a control slidewire, a valve slidewire, a reset resistor and a reset capacitor, together with an amplifier controlling the direction and extent of rotation of a motor arranged to position a final control element. The circuit components of the network establish a predetermined relation between the rotation of the motor with deviation of the controlled variable from the control point. As applied to a steam boiler, the system may function to regulate a device such as a damper which controls the recirculation of flue gases. However, when such device has been moved from one extreme position to the other, its usefulness disappears. Accordingly, the control system may automatically transfer to a different device or final control element, such as a spray water valve in a steam desuperheater. Since the characteristics of two such final control elements may greatly differ, the nature of the relationship between the position of the final control element and deviation of the controlled variable from the control point may be drastically changed when the transfer is made. This may be done by introducing into the network an auxiliary signal which effects a substantial change in the resultant control signal. In accordance with the invention, transfer from one relationship to the other is effected while the motor is maintained at standstill to hold the manipulated variable at its existing value, and resumption of control by the network is accomplished only after it has been temporarily balanced or equilibrium conditions established therefor.

While the invention may be applied to relatively simple control systems where abrupt changes in control adjustments, such as proportional band, reset action, or rate action are desired, it is particularly useful in more complex processes in which it is desired to maintain within reasonably close limits the magnitudes of two controlled variables which are to some degree at least interdependent upon changes in at least one manipulated variable. Automatic transfer from one control relationship to another is effected in accordance with the position of a final control element without upset of the system, without abrupt shifts of any final control element, and as a result of temporary balance provided for the control system established during the period when the manipulated variable is maintained at its existing value.

Figure 2:
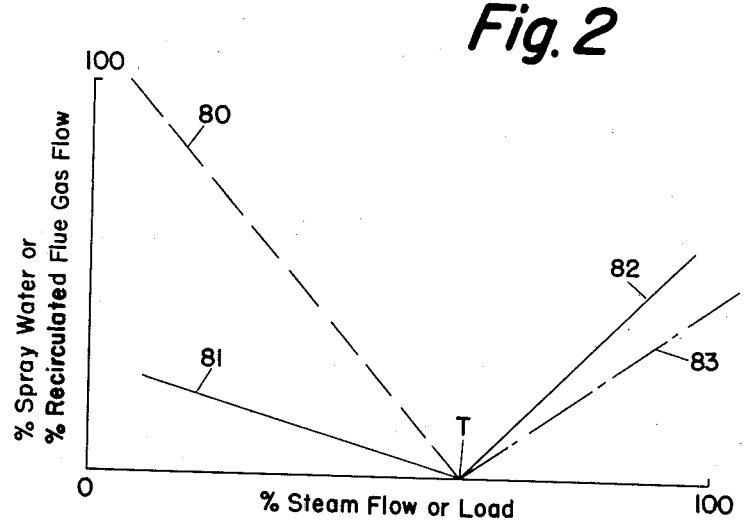
Figure 3:
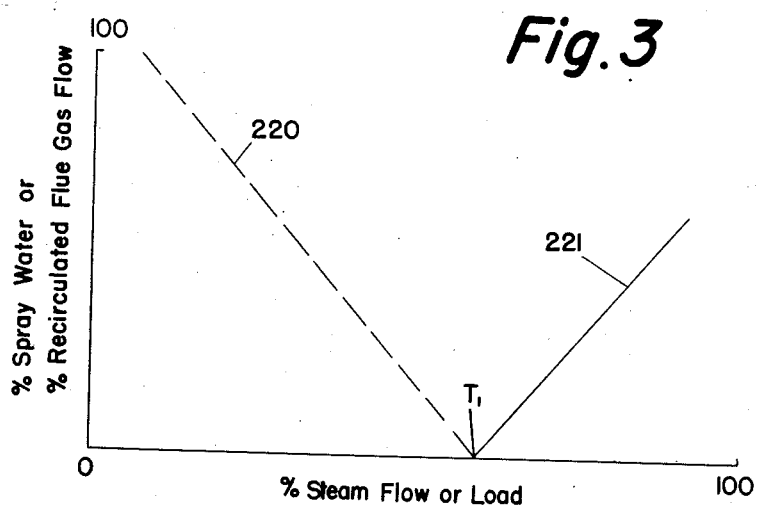
Figure 4:
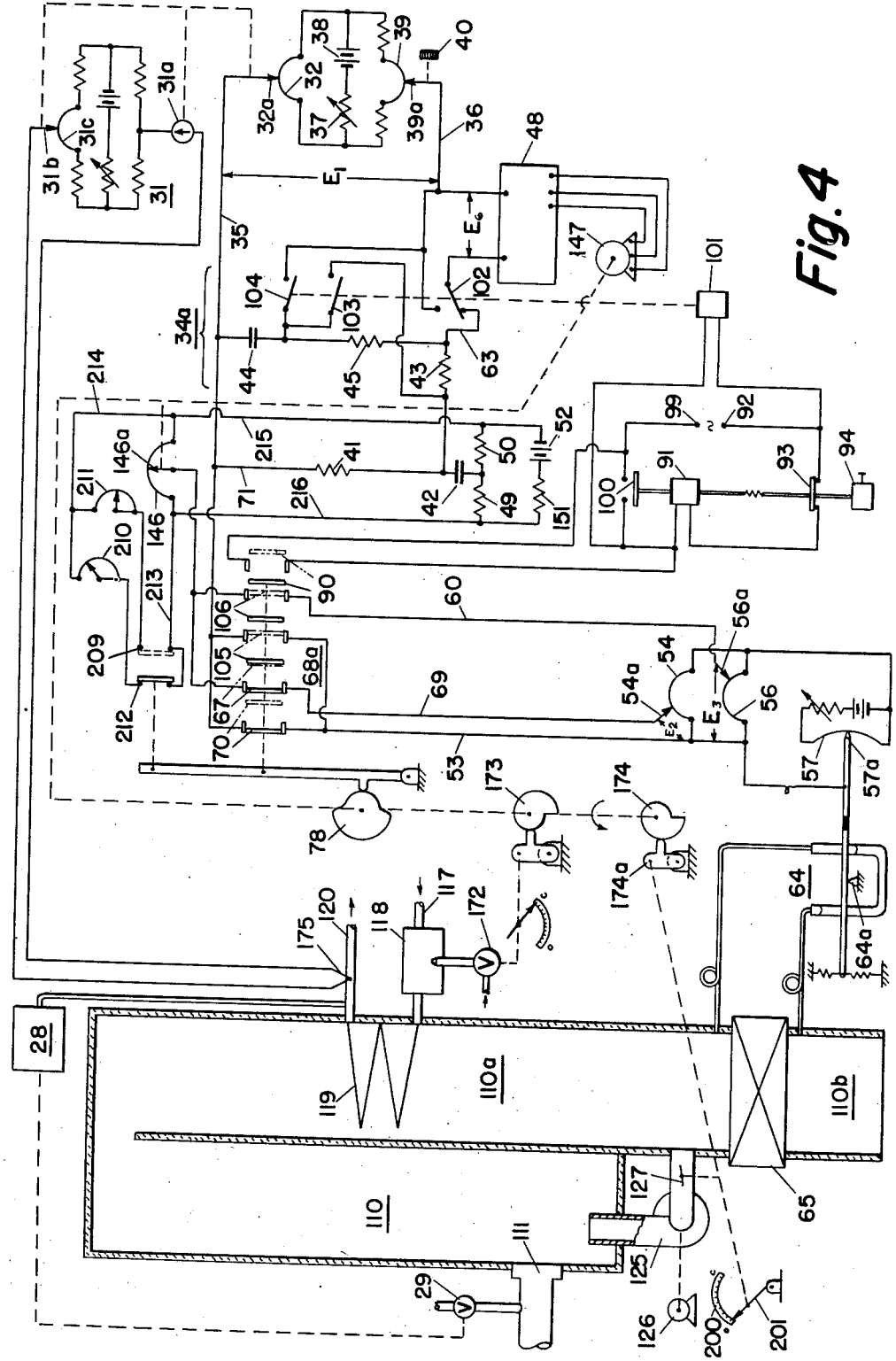

For further objects and advantages of the invention, reference is to be had to the following description taken in conjunction with the accompanying drawings, in which:

Fig. 1 diagrammatically illustrates the invention as applied to the control of a vapor generator;

Figs. 2 and 3 are graphs useful in explaining the invention;

Fig. 4 diagrammatically illustrates a modification of the invention; and

Figure 5:
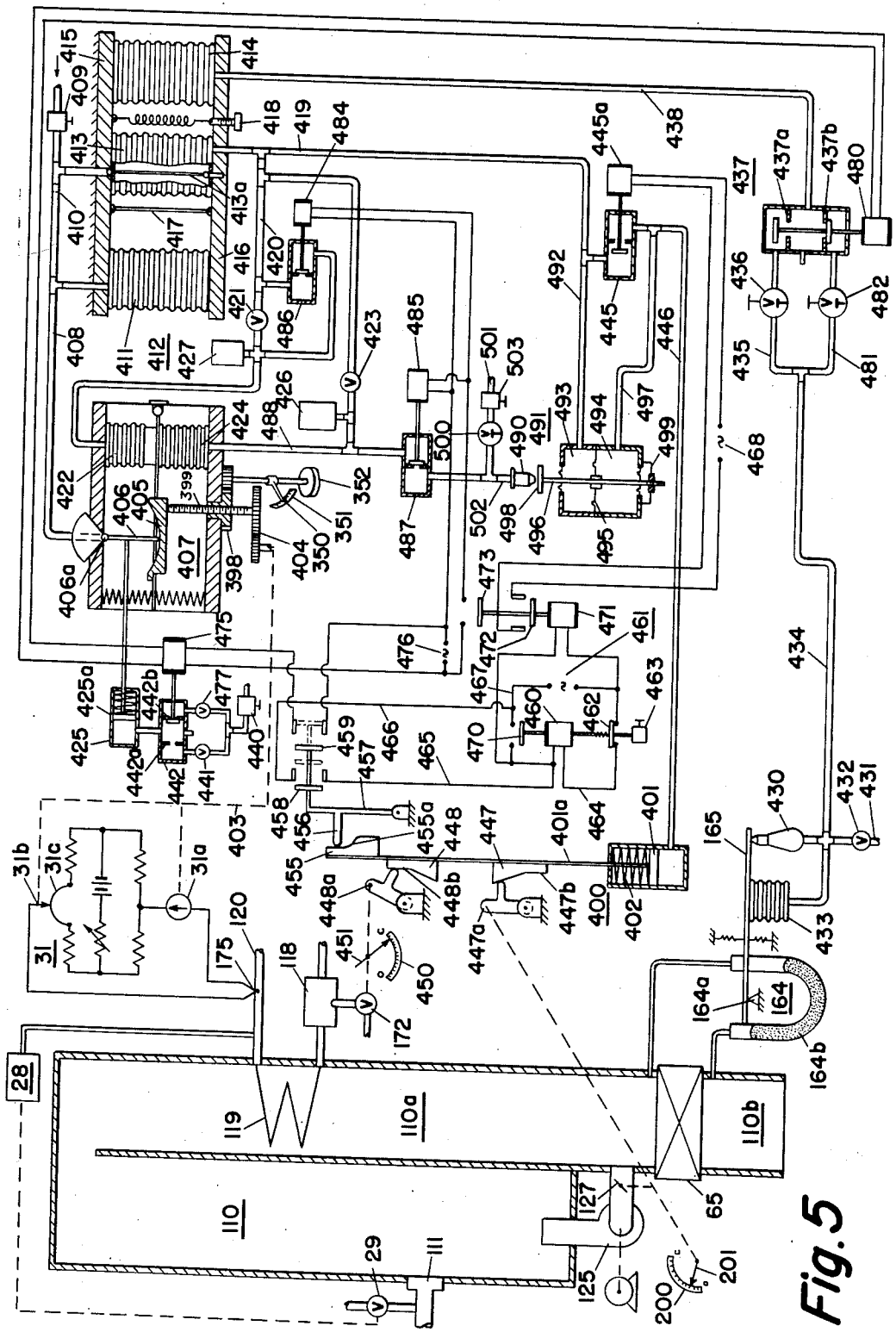

Fig. 5 diagrammatically illustrates the invention as embodied in a pneumatic control system.

Referring to Fig. 1 of the drawings, the invention in one form is illustrated as applied to certain of the controls utilized in vapor generators, such as a boiler or steam generator 10, having a plurality of burners, one of which, the burner 11, is shown. The boiler or steam generator 10 has omitted therefrom water coils, the steam drum, and details of the fire box, and the several steam-heating coils have been shown diagrammatically in the convection section 10a. Steam from any source, such as from the steam drum, is supplied by way of line 12 to the primary superheater coil 13. It is then transferred by way of line 14 to the secondary superheater coil 15 and delivered by way of pipe 16 to the turbine. In many installations it has been found desirable, after expansion of high-temperature, high-pressure steam through one or two sections of the turbine, to return it to the steam generator for reheating. Thus, such steam may enter by way of line 17 and after passage through a spray-cooler or desuperheater 18 enters reheater coil 19 and by way of line 20 is returned to one of the later sections of the turbine.

The first controlled variable in this example is the temperature of the steam in outlet line 16. A second controlled variable is the temperature of steam in outlet line 20 from the reheater coil. Though simplified for purposes of explaining the present invention, the overall control problem here contemplated is to maintain the two controlled variables at their respective control points under widely varying load conditions.

The outlet temperature of the steam in line 16 is affected by the temperature and volume of the combustion gases flowing into the convection section and in heat-exchange relation with the superheater coils 13 and 15. The outlet temperature of the steam in line 16 is also controlled by a desuperheater 21 (of like construction with the water-cooler or desuperheater 18 previously referred to) and includes a valve 22 regulating, from a source of cooling water delivered through line 23, the spray from a nozzle 24 directed into the flow of steam entering the superheater coil 15.

During conditions of low load, the rate of fuel delivery to the burners 11 will be correspondingly low, and the volume and temperature of combustion gases passing through the convection section would be correspondingly small were it not for recirculation of flue gases as by a recirculating fan 25 driven by a motor 26. The heat content of the hot products of combustion entering the convection section 10a is increased with maximum recirculation of flue gases, i. e., when the final control element or damper 27 is in its fully opened position in response to automatic control action associated with thermocouple 75 as later described. Not only is the volume of hot products of combustion entering convection section 10a increased, but also the greater rate of flow of the gases through the fire chamber decreases the absorption of heat by the walls of that chamber (commonly provided with water tubes) and thus maintains at a higher level the heat content of the gases entering the convection section. As the load increases, so will the rate of firing of the burners increase, through the action of a combustion control system such as disclosed in U. S. Letters Patent 2,657,347 granted upon my copending application, Serial No. 271,487, and here diagrammatically indicated by block 28 operating upon valve 29. With hot products of combustion produced at a higher rate, it is desirable to reduce the recirculation of the flue gases.

In the form of the invention illustrated in Fig. 1 a thermocouple 30 responsive to the steam temperature in output line 16 is connected to a balanceable measuring network 31 which need not be described in detail since it may be of the type fully disclosed in Wunsch Patent No. 1,209,372. As the temperature of the steam in line 16 changes, a detector-drive unit 31a, controlled as in Williams Patent No. 2,113,164 or by a mechanical relay, such as shown in Squibb Patent No. 1,935,732, rebalances network 31 by relatively adjusting the position of a contact 31b relative to slidewire 31c. It also relatively adjusts a contact 32a relative to a control slidewire 32 forming a part of a balanceable electrical network 34. The relative positions between contact 32a and slidewire 32 will determine the magnitude of a control signal $E_1$ developed between conductors 35 and 36 by a network including said slidewire 32 and adjustable resistor 37, a battery 38 and a control point setter comprising slidewire 39 and an adjustable contact 39a movable relative to the slidewire as by a knob 40. For convenience in further description, each slidewire will be described in terms of movement of the contact, though it is to be understood that the slidewire itself may be rotated relative to a stationary contact which is the more usual form in which such devices are utilized.

The control network 34 includes a reset resistor 41, a reset capacitor 42, a rate resistor 43, a rate capacitor 44, and a resistor 45 in series in the branch of the network including the rate capacitor 44. The network also includes a follow-up or valve slidewire 46 having an adjustable contact 46a movable with change in position of valve 22 as by a motor 47 under the control of amplifier 48 which, for example, may be of the type disclosed in said Williams Patent No. 2,113,164. That part of the network including the reset resistor and capacitor also includes resistors 49 and 50, together with an adjustable resistor 51 in series with a battery 52. The control network 34 thus far described has been fully disclosed by Elwood T. Davis, in U. S. Letters Patent 2,666,170 granted upon his application Serial No. 149,775, filed March 15, 1950, such a system also being disclosed as applied to the solution of a control problem similar to that of the present case, in U. S. Letters Patent 2,688,717 granted upon his application Serial No. 271,486, filed February 14, 1952.

In addition to the control signal $E_1$ introduced by slidewire 32 and its associated network, there is also introduced a second control signal which may be either the potential difference or voltage $E_2$ developed between a conductor 53 and the contact 54a of a slidewire 54, or a control signal $E_3$ of opposite polarity developed between a conductor 55 and a contact 56a of a slidewire 56. The magnitudes of the control signals $E_2$ and $E_3$ are dependent upon the respective positions of contacts 54a and 56a relative to their associated slidewires and also upon the position of movable contact 57a relative to a slidewire 57 energized from a battery 58 by way of a variable resistor 59. Thus, the amplifier 48 responds to an input voltage $E_6$ whose magnitude will depend upon the relative magnitudes of the control signals $E_1$ and $E_2$ or $E_3$ and also $E_4$ and $E_5$ as later described.

Assuming now that the load on the steam generator 10 begins to change and that the rate of firing of the burners 11 is correspondingly changing, as above explained, both the volume and the temperature of the gases and hot products of combustion entering the convection section 10a change. There will be a deviation of the steam temperature in superheater section 15 from its desired value. To anticipate this change and minimize its extent there is provided an anticipatory device or tilting manometer 64 as later described.

The deviation in steam temperature in line 16 is detected by thermocouple 30 and produces operation of the actuating device 31a to adjust contacts 31b and 32a of their respective slidewires. The development in network 34 of a control signal $E_1$ energizes through the amplifier 48 the motor 47 which thereupon moves the valve 22 the amount needed to vary the supply of cooling water to the desuperheater 21 as required to return the temperature of the steam in line 16 to its predetermined value. That value, of course, depends upon the position of the control point setter 39a under the control of knob 40. An indicator including a scale 61 and associated pointer 61a provides visual indication of the extent of opening of valve 22, i. e., the position of the final control element.

Before describing the dependent effect upon the steam in superheater coil 19, further explanation will now be made of the operation of the control network 34. The rebalancing effect achieved by moving contact 46a of slidewire 46 in direction to restore balance of the network after production of the control signal $E_1$ by movement of contact 32a provides proportional-position action, which may be mathematically expressed as $K_1\theta$, where $K_1$ is the proportional-action constant and $\theta$ is the deviation of the controlled variable from the control point.

The position of the final control element, the valve 22, is also determined by an integral or reset control action which may be mathematically expressed as the time integral of the deviation $\theta$, i. e., equal to the factor $$K_2 \int \theta \, dt$$

where $K_2$ is a constant and $t$ is time. Such a control action corrects for offset which would otherwise be introduced by changes in load.

It is important to an understanding of the invention to keep in mind the fact that the amplifier 48 has a high gain and it is effective either directly or through auxiliary motor control means to energize the motor 47 to maintain approximate balance of the control system 34. Thus, for proportional-position action, the adjustment of slidewire contact 46a will be such as to maintain a potential difference of voltage $E_4$ equal and opposite to the control signal $E_1$. Whenever $E_4$ is made exactly equal to $E_1$, the output of amplifier 48 drops to its minimum value and the motor 47 is deenergized.

With the reset capacitor 42 in the circuit as illustrated, it will be seen that in order for a potential difference $E_4$ to appear across reset resistor 41, there must be a current flow therethrough. Since the amplifier 48 has a high input impedance, that current flow will primarily be through capacitor 42. As current flows, the capacitor will accumulate a charge and the potential across it will rise. In order to maintain the same potential difference $E_4$ across resistor 41, the potential difference applied thereto must also rise as by increasing the adjustment of movable contact 46a. Thus, the change in charge on the capacitor 42 with time modifies the action of the valve slidewire contact 46a by motor 47 to introduce the integral or reset action.

The control system 34 also has included in it provisions for rate action, mathematically expressed as $$K_3 \frac{d\theta}{dt}$$

where $K_3$ is a constant. The circuit components include the rate resistor 43 and the rate capacitor 44. The resistor 43, being in series in the input circuit to the amplifier, attenuates the voltage $E_4$ by reason of a current flow through the branch including resistor 45 and rate capacitor 44. Accordingly, in order that $E_5$, the potential difference between conductors 35 and 63, shall be equal and opposite to $E_1$ to maintain the input voltage $E_6$ approximately zero, $E_4$ must be made greater by the amount of the attenuation due to resistor 43. Thus, valve 22 and slidewire contact 46a will be moved an additional amount depending upon the rate of change of the controlled variable $\theta$. The capacitor 44 is preferably smaller in value than the capacitor 42.

In addition to the proportional-position action, the reset action and the rate action, there is, in accordance with the present invention, introduced a control action which takes into account the rate at which the products of combustion flow outwardly from the convection section through the exit 10b. The flow rate is measured by means of a tilting manometer 64 pivoted at 64a and connected to opposite sides of an air preheater 65 though, of course, it may be connected across any flow obstruction providing the necessary change in differential of pressure with change in flow of combustion products.

As above indicated, an increase in the flow of combustion gases due to an increased firing rate results in increased heating of the steam in coils 13 and 15 and thus requires an increase in the desuperheater spray rate. However, closure of the damper 27 reduces the temperature and/or volume of gases effective to heat section 13 and 15 and thus compensates to substantial degree for the increased rate of firing. Accordingly, as long as the damper 27 is effective under the control of thermocouple 75, control system 76 and motor 77, an anticipatory effect is provided by the tilting manometer 64 by movement of its contact 57a relative to slidewire 57 to vary the magnitude of the control signal $E_2$ which has the effect of altering $E_6$ to change the extent of movement of the desuperheater control valve 22. As long as there is possible change in the volume of combustion gases by means of damper 27, the polarity of the control signal $E_2$ is preferably in the direction to effect closing movement of valve 22 as a result of increased flow from the convection section at exit 10b. The magnitude of $E_2$ with change in position of contact 57a is, of course, determined by the positioning of contact 54a relative to slidewire 54, the particular setting thereof depending upon the particular characteristics or requirements of the given boiler installation. It will be observed the control voltage $E_2$ is inserted into the control network 34 between the contact 46a and the reset resistor 41.

The circuit may be readily traced from slidewire contact 46a by way of conductor 66, contacts 67 of a transfer switch 68, conductor 69, contact 54a, the left-hand part of slidewire 54, conductor 53, contacts 70 of transfer switch 68, and by conductors 35 and 71 to reset resistor 41.

The polarity of the auxiliary control signal $E_2$ is such that it produces an unbalance signal or potential $E_6$ in a direction to energize motor 47 to close valve 22 in response to an increased flow of combustion products as detected by manometer 64. By the anticipatory action thus provided, the temperature of the steam in line 15 is maintained much more uniform than without such action.

The effect upon the reheater coil 19 of a change in the temperature and volume of the combustion gases is somewhat similar to superheater sections 13 and 15. However, in order concurrently to maintain the temperature in outlet line 20 at a predetermined value, i. e., the control point, damper 27 is adjusted as by a cam 74 and associated cam follower 74a to vary the recirculation of gases in accordance with change in temperature of the steam in line 20. To this end, the thermocouple 75 through a suitable measuring and control system, shown in Fig. 1 in block diagram as 76 and which may be of the types fully disclosed in Figs. 4 and 5, controls the operation of a motor 77 which drives cams 73, 74 and a cam 78 provided to actuate the transfer switch 68 through the cam follower 78a. Thus, as the heat content of the combustion gases and products of combustion and change of steam flow cause the steam temperature in section 19 to vary, the thermocouple 75 initiates actuation of motor 77 to adjust damper 27 to vary the quantity, and to some degree the heat content, of the gases, and enough so as to return the steam in line 20 to the control point. The regulating effect thus far described has been found adequate for the lower portion of the steam generator load range. As load on the steam generator is increased a point will commonly be reached where the damper 27 will have been moved to, or substantially to, its closed position. Through further rotation of motor 77 the desuperheater 18 will then be brought into action, as steam generator load is increased, by a control valve 72 actuated by a cam 73 and associated cam follower 73a. Conversely, as the load decreases from a relatively high value to a substantially lower value, the desuperheater 18 need not be utilized, and adequate control may be achieved by transferring to operation of damper 27.

It will now be observed that there is an interdependency between the actions of the two control systems thus far described. A reduction in the quantity of combustion gases also reduces the heat transfer in sections 13 and 15, as well as in section 19. Accordingly, as the quantity of recirculated gases decreases due to the action of the damper 27, the desuperheater 21 need be adjusted to lesser degree than if the quantity of combustion products had not been changed. However, when the control effect due to the damper 27 has been exhausted due to its movement to minimum position, further increase in the quantity of combustion gases will be due solely to increased firing rates of burners 11.

The situation is graphically indicated in the explanatory diagram of Fig. 2. As the recirculated gases decrease from a maximum rate of flow as indicated by the broken line 89 with increasing load in terms of steam flow, there will be a point T at which the control effect of damper 27 is exhausted. Thus, the line 80 will intersect the zero axis. During the foregoing period of rising load, the control action due to the desuperheater 21 is illustrated by the solid line 81 indicating that the desuperheater 21 requires less and less water as load increases. However, at the transfer point T a curve exemplary of the needed desuperheater action for the steam in line 16 for further increasing load is represented by the solid line 82. Curves 81 and 82 represent discontinuous functions, and yet in accordance with the invention the control satisfies the required operating conditions without upsetting the system and without abrupt changes in the positions of any of the final control elements. As damper 27 is moved toward its closed position by counterclockwise movement of cam 74, cam 78 has been moved to a position where the crest of the cam engages the cam follower to move the transfer switch 68 from its illustrated left-hand position to its right-hand position. At the same time the cam 73 has been moved to a position where the cam follower 73a thereafter is effective in controlling valve 72 for desuperheater 18, in accordance with the characteristic curve for the reheater spray water as illustrated by the broken line 83 in Fig. 2.

As the transfer switch 68 is moved to its right-hand position a circuit is momentarily completed by contact 90 for energization of a relay 91. The energizing circuit may be traced from a supply line 92 by way of contacts 93 normally closed and held in closed position by any time delay means, such as a dashpot 94, until a time interval after the coil 91 has been energized. The circuit continues from contacts 93 by way of conductor 95, operating coil of relay 91, conductor 96, contact 90, and by way of conductor 98 to the other supply line 99. The relay 91 immediately moves its contact 100 to complete a holding circuit for its operating coil, which holding circuit will be observed from inspection of the diagram. Contact 90 simultaneously completes an energizing circuit for the operating coil of a relay 101 which thereupon moves its contacts 102, 103 and 104 from their lowermost positions to their uppermost positions. Contact 102 maintains the existing value of the manipulated variable, i. e., the rate of flow of water into desuperheater 21 by maintaining in fixed position the valve 22. This is accomplished by preventing energization of motor 47 by short circuiting the input to the amplifier 48. Contacts 103 and 104 remove from the circuit the resistors 43 and 45 and thus connect capacitor 44 and reset resistor 41 in parallel across conductors 35 and 36 and thus across voltage signal $E_1$. The opening of contacts 67 and 70 of transfer switch 68, which occurs after closure of contact 90, removes from the circuit the control signal $E_2$ developed between conductors 53 and 69 having the polarity corresponding to closing action at valve 22 for increase of gas flow at exit 10b. The closure of contacts 105 and 106 of transfer switch 68, which occurs after the opening of contacts 67 and 70, connects the control signal $E_3$ developed between conductors 55 and 69 of polarity opposite to signal $E_2$ into the control network 34 between contact 46a and reset resistor 41. The signal $E_3$ provides anticipatory effect for operation of valve 22 when damper 27 is closed.

Since $E_2$ and $E_3$ are of opposite polarity and generally of different magnitudes, the change in the control signal is abrupt, i. e., a step function, and in the absence of the invention would cause a change in position of valve 22 and of slidewire contact 46a. However, by reason of the introduction of the abrupt signal change into the reset circuit, the difference voltage, i. e., the difference between $E_1$ and the sum of $E_3$ and the potential difference resulting from the position of contact 46a, is effective to change the charge of the capacitor 42 which in conjunction with capacitor 44, the latter receiving a charge equal to $E_1$, is effective to produce temporary balance of the network 34. Only a short interval of time is required to achieve such balance. After the expiration of that short interval of time the timer 94 releases contacts 93 opening contact 100 which opens the circuit of relay 101, thus restoring the control of valve 22 to the control system which thereupon takes over in accordance with the several control actions previously described.

When the steam flow or load is decreased to a value below the transfer point T, Fig. 2, the foregoing operations will be repeated in reverse sequence. More particularly, transfer switch 68 is actuated to its original position as shown in Fig. 1 and during its return movement contact 90 is momentarily closed energizing the operating coils of relays 91 and 101 to operate their associated contacts and produce temporary balance of network 34 in manner similar to that previously described. After the short time interval determined by timer 94 the operation of valve 22 is restored to the control system with damper 27 then being in its operating range.

There has been described a control system which will regulate the magnitude of the controlled variable, even though discontinuous functions be involved, and yet without upsetting or disturbing the system and without any attention or action required of an operator.

Referring to Fig. 4 there is diagrammatically illustrated another form or modification of the invention as applied to a steam generator 110, having a plurality of burners, one of which, the burner 111, is shown. As in the case of the boiler or steam generator 10 of Fig. 1, the usual details such as water coils, the steam drum, and details of the fire box, have been omitted therefrom to simplify the drawing. Steam from any suitable source, such as from the steam drum, is supplied by way of inlet pipe 117 to a superheater coil 119 in the convection section 110a, and delivered by way of outlet pipe 120 to a steam turbine (not shown). This modification of the invention is somewhat more simplified than that shown in Fig. 1 in that there is only one controlled variable, i. e., the temperature of the steam in outlet line 120 from superheater 119. There are two final control elements that are operable in response to the output from a thermocouple 175 in line 120 to maintain the magnitude of the controlled variable at a predetermined value, namely the spray water valve 172 of the desuperheater 118 in the inlet line 117 of superheater 119 and the damper 127 in the flow passage for the recirculation flue gases interconnecting the convection section 110a with the burner section of steam generator 110. As the two final control elements 172 and 127 generally have different characteristics provision has been made in Fig. 4 for setting independently the proportional band effective during the control of each element as later to be described.

Many of the elements of the control system of Fig. 4 are the same as those of Fig. 1, and thus, where possible, like elements have been identified with like reference characters. In describing the operation of Fig. 4 it will first be assumed that the steam generator 110 is operating under low load conditions. At such time the rate of delivery of fuel to the burners 111 will be correspondingly low, and the heat content of the combustion gases passing through the convection section 110a would be correspondingly small in the absence of the provision for recirculating the flue gases as by recirculating fan 125, driven by the motor 126. Variation in the position of damper 127 will change the volume of the hot products of combustion entering the convection section 110a, with resultant steam temperature regulating effect as described in connection with Fig. 1.

In the form of the invention illustrated in Fig. 4 the thermocouple 175 responsive to the steam temperature in output line 120 is connected to the balanceable measuring network 31. It will be assumed there has been a change in the rate of flow of combustion gases through the exit 110b as a result of a change in the boiler load. This change in gas flow will immediately be detected by the tilting manometer 64 that is connected across the air preheater 65 even though there has been no change as yet in the output of thermocouple 175 in steam line 120. Due to the capacity effect of superheater coil 119 the steam temperature in output line 120 does not change immediately with a change in the flow rate through convection section 110a, but lags behind this change. Accordingly, an anticipatory effect is provided in the control system to anticipate the change that would be called for by the control as a result of a change in temperature which would be detected by the thermocouple 175 if the steam temperature in line 120 changed immediately with change in rate of gas flow through the convection section 110a. This anticipatory effect is provided by the tilting manometer 64 which is pivoted at 64a and moves its contact 57a relative to the slidewire 57 to vary the magnitude of the control signal $E_2$ inserted in the control network 34a between the contact 146a and the reset resistor 41. This has the effect of altering the input voltage $E_6$ to amplifier 48 which through drive motor 147 controls the extent of movement of the final control elements, damper 127 and spray water valve 172. By the anticipatory action thus provided the temperature of the steam in line 120 is maintained much more uniform than would be possible without such action as any changes in the steam temperature will have been minimized in advance.

It will now be assumed that the anticipatory action has taken place and that the steam temperature in output line 120 does deviate from the selected value as predetermined by the position of control point setter 39a under the control of knob 40. Such deviation in temperature is detected by thermocouple 175 in line 120 and produces operation of the actuating device 31a to adjust contacts 31b and 32a relative to their corresponding slidewires 31c and 32. The foregoing operation changes the magnitude of the control signal $E_1$, between conductors 35 and 36 in control network 34a which in turn changes the input voltage $E_6$ to amplifier 48 energizing the motor 147. The motor 147 moves the damper 127 as required to return the temperature of the steam in line 120 to its predetermined value. Visual indication of the extent of opening of damper 127 may be provided by an indicator scale 200 and associated pointer 201.

It will be observed that motor 147 also adjusts contact 146a. The rebalancing effect achieved by moving contact 146a relative to slidewire 146 to restore balance of control network 34a after production of the control signal $E_1$ due to movement of contact 32a, provides proportional position action, i. e., action in which there is a continuous linear relation between the value of the controlled variable and the position of a final control element or the value of a manipulated variable. The range of values of the controlled variable which corresponds to the full operating range of the final control element is commonly referred to as the proportional band.

The proportional band is usually defined in percent of controller scale. For a 100% proportional band for example the valve is fully stroked when the temperature changes by an amount equivalent to the full scale of the instrument. A 10% proportional band setting on the other hand produces full valve travel with a change in temperature corresponding to 10% of the instrument range. The width of the proportional band is a function of the relative voltages on the control and drive unit slidewires. In Fig. 4, the drive unit slidewire 146 is utilized with both of the final control elements, namely, damper 127 and valve 172. Accordingly for explanation purposes, it may be assumed that one-half of the slidewire corresponds to a full stroke of the damper 127 and the other half of the slidewire 146 corresponds to a full stroke of the valve 172, as later to be more fully described.

Provision has been made for adjusting the proportional band used with either the damper 127 or the valve 172 as by the provision of variable resistances 210 and 211 connected in parallel across slidewire 146. The variable resistance 210 forms a series loop with battery 52 as by way of conductors 215 and 214, resistance 210, contacts 212, conductors 213 and 216 and a fixed resistor 151. When the resistance of variable resistor 210 is changed, there will be a change in the current through resistor 151 adjacent battery 52 and thus there will be a change in the voltage across slidewire 146. Accordingly by adjusting the voltage across slidewire 146, with respect to the voltage across control slidewire 32, the proportional band of the damper 127 may be adjusted as desired.

It will be observed that the system of Fig. 4, like the system of Fig. 1, includes provisions for reset and rate action, and since these features of the system operate in the same manner as those previously described in connection with Fig. 1, further explanation is believed unnecessary.

It will further be assumed that adjustment of damper 127 has been made to its fully closed position but such adjustment has not been sufficient to return the steam temperature in line 120 to the control point. Accordingly, there will still be a voltage $E_6$ applied to the input terminals of amplifier 48, and thus the drive motor 47 will continue to rotate cams 78, 173 and 174 in counter-clockwise direction. It will be observed from the shape of cam 174 that during the foregoing rotation by motor 147 the cam 174 has moved cam follower 174a sufficiently to close the damper 127. The shape of cam 174 is such that further counter-clockwise rotation of this cam will maintain damper 127 in closed position. The shapes of cams 78 and 173 are such that up to this point rotation of these cams has not caused actuation of either valve 172 or transfer switch 68a. At this point drive motor 147 has moved contact 146a and cams 78, 173 and 174 through approximately 90°. Continued rotation of motor 147 causes the rise on cam 78 to move transfer switch 68a from its left-hand position, as illustrated, to a right-hand position, thereby momentarily closing contact 90 followed by opening contacts 67 and 70 and thereafter closing contacts 105 and 106. When the contact 90 is closed momentarily, the relay 91 is energized whereupon contact 93 normally closed is held in closed position by time-delay means 94 until a time interval after the coil 91 has been energized. Upon energization of relay 91, its contact 100 is immediately moved to complete a holding circuit for its operating coil. Contact 90 simultaneously completes an energizing circuit for the operating coil of relay 101, the latter thereupon moving contacts 102, 103 and 104 from their lower-most positions to their upper-most positions. With the closing of contact 102, it will be seen that the input to amplifier 48 is short-circuited thus preventing energization of motor 147, and maintaining the existing positions of the damper 127 and spray water valve 172. Thus, the existing values of the manipulated variables will be maintained constant. The contacts 103 and 104 remove from the circuit resistors 43 and 45, and thus connect capacitor 44 and reset resistor 41 in parallel across conductors 35 and 36 and thus across voltage signal $E_1$. The opening of contacts 67 and 70 removes from the circuit the control signal $E_2$ existing between conductors 53 and 69 and having the polarity corresponding to closing action of the damper 127 for increase of gas flow at exit 110b. The closing of contacts 105 and 106 connects the control signal $E_3$ existing between conductors 53 and 60 into the control network 34a between contacts 146a and the reset resistor 41.

Signals $E_2$ and $E_3$ are of differing magnitudes and the change from one to the other is abrupt, i. e., a step function, and in the absence of the invention would cause a change in position of motor 147 and slidewire contact 146a and thus valve 172. However, by reason of the introduction of the abrupt signal change into the reset circuit, the difference voltage, i. e., the difference between $E_1$ and the sum of $E_3$ and the potential difference resulting from the position of contact 146a, is effective to change the charge of the capacitor 42 which in conjunction with capacitor 44, the latter receiving a charge equal to $E_1$, is effective to produce temporary balance of the network 34a. Only a short interval of time is required to achieve such balance. After the expiration of that short interval of time, the timer 94 releases contacts 93 which open contact 100 and thereby open the circuit of relay 101, opening contacts 103, 104, and moving contact 102 to its lower position, thus restoring the control of valve 172 to the control system.

Provision has been made in the system of Fig. 4 for varying the proportional band used with valve 172. When transfer switch 68a is moved to its right-hand position, contacts 212 are opened and contacts 209 are closed, thus inserting the variable resistor 211 in series with conductors 213 and 214, and across the drive unit slidewire 146. Since the characteristics of the damper 127 and the spray water valve 172 are generally different, it is desirable to provide different proportional band setting for each of these final control elements, and the variable resistor 211 provides for a separate proportional band for valve 172 in a manner similar to that previously described for variable resistance 210 in connection with damper 127.

With spray water valve 172 in desuperheater 118 now under control of motor 147, the valve 172 will continue to be adjusted until the temperature of the steam in output line 120, as detected by thermocouple 175, reaches the control point. Should the load in the steam generator 110 change such that spray water is no longer needed in the desuperheater 118 and sufficient control can be provided by the operation of damper 127, the motor 147 will operate to rotate the cams 78, 173 and 174 toward their positions shown in Fig. 4, thus returning transfer switch 68a to its original position and restoring damper 127 to the control of motor 147 as the final control element. As transfer switch 68a is returned to its original position contact 90 closes momentarily followed by the opening of contacts 105 and 106 in turn followed by the closing of contacts 67 and 70.

Fig. 3 of the drawings is exemplary of the operation of the system of Fig. 4, with broken-line 220 illustrating the flow of recirculated flue gas decreasing to a transfer point $T_1$, at which time the damper 127 is closed and with the solid line 221 representing the flow of spray water controlled by valve 172. In this particular application the spray water was not turned on in desuperheater 118 until the damper 127 had been closed.

From the foregoing it will be seen that the control system of Fig. 4 provides a system which will regulate the magnitude of the controlled variable when there is a discontinuity in one of the input signals to the control network or when it becomes desirable to automatically change one or more of the control adjustments without upset or disturbance of the system and all of the foregoing is accomplished without any attention or action required on the part of the operator.

Referring to Fig. 5, the invention has been shown diagrammatically as applied to a pneumatic control system for controlling the steam temperature in outlet line 120 of steam generator 110 of Fig. 4. This pneumatic control system is of a type such as described in McLeod Patent No. 2,507,606, and in Patent No. 2,679,022 and Patent No. 2,714,894 respectively granted upon the copending applications of Archibald McIlhenny, Serial No. 256,003, filed November 13, 1951, and of Laurence E. Jewett, Serial No. 294,700, filed June 20, 1952. As shown, the controlled variable, the steam temperature in outlet line 120 from superheater coil 119, is varied by changing the positions of condition controlling elements shown as damper 127 associated with the recirculating fan 125 for recirculation of flue gas through the fire-box of steam generator 110 and supply water valve 172 in desuperheater 118 associated with the superheater coil 119. The final control elements 127 and 172 may be opened to any desired extent by means of any suitable pneumatic actuator, shown here as a pneumatic cylinder 400 including a piston 401 operating against the bias of spring 402. The temperature of the steam in outlet line 120 is detected by the thermocouple 175, the latter being connected to a balanceable measuring network 31 as previously described. Selection of a desired control point, as determined from the position of a pointer 350 with reference to a suitably calibrated scale 351, may be made by rotating knob 352 to manually adjust gearing 398 and thereby axially move threaded stem 399 against baffle 405. Upon change of the temperature of the steam in outlet line 120 from the control point, the actuating unit 31a, previously described, adjusts the slidewire contact 31b relative to slidewire 31c to restore balance of the measuring network 31, and concurrently through mechanical connection 403 and the associated gearing 404 axially adjusts the position of stem 399 and thereby of baffle 405 relative to a nozzle 406 in a pilot unit 407. The air pressure applied against piston 401 is under the control of the pneumatic control system and varies with change of the position of baffle 405 relative to nozzle 406 in manner now to be described.

Air is delivered to nozzle 406 from a suitable supply by way of a pressure regulator 409, an orifice 410 and a pipe 408. A bellows 411 is flow-connected to pipe 408 intermediate orifice 410 and nozzle 406. The bellows 411 forms a part of a pneumatic relay or booster 412 which here also includes bellows 413 and 414, the purpose of bellows 414 later to be described. All three bellows 411, 413 and 414 are mounted between a stationary support 415 and a movable lower plate or lever 416 pivotally supported from stationary member 415 as by a flexible hinge 417. An adjustable tension spring 418 is provided for varying the force applied to plate 416. The bellows 411 and 413 diagrammatically correspond to the three bellows of the booster unit fully disclosed in said McLeod patent.

As the baffle 405 is moved toward or away from nozzle 406, pressure introduced from the supply line by way of orifice 410 and pipe 408 is varied in magnitude in line 408, depending upon the rate of flow through the nozzle 406. This rate of flow in turn, depends upon the spacing between the end of that nozzle and the curved baffle 405 of pilot unit 407. Thus the pressure in line 408, and as applied to bellows 411 of the pneumatic booster, varies with change in temperature in steam line 120. The bellows 411 rotates the lever or lower plate 416 pivoted at flexible hinge 417 to change the position of a valve controlling element 413a associated with bellows 413. When the pressure in bellows 411 is increasing the lever 416 will be rotated in a counterclockwise direction and through valve element 413a will permit air to flow from a supply line through regulator 409 into bellows 413 until the pressure therein bears a predetermined relation to that in bellows 411. This relationship will depend upon the relative lengths of the lever arms with respect to the pivot 417. Since the bellows 413 has the shorter lever arm, the pressure in bellows 413 will be higher than in bellows 411 with the lever 416 in the balanced position with both ends of valve element 413a in closed position. Thus the pressure changes in the output line 419 will vary with the temperature of the steam in line 120, but will be magnified with respect to the pressure changes in line 408.

As further disclosed in said McLeod patent, the output pressure in line 419 is applied by way of line 420 through a valve 421 to a proportional bellows 422 of the pilot unit which acts in a direction to oppose the change in position of baffle 405 produced by the change in steam temperature detected by thermocouple 175. A capacity tank 427 is provided in line 420 leading to proportional bellows 422. The negative feedback provided by bellows 422 produces a reduced movement of baffle 405 for a given change in steam temperature in line 120 so that the pressures in line 408 and in the output line 419 from the booster vary linearly with the temperature of the steam in line 120. The proportional band or extent of steam temperature change to effect full range of output pressure in line 419 may be varied by rotation of nozzle 406 about its pivot 406a. Provision has been made as by pneumatic actuator 425, for automatically changing the proportional band when control is transferred from final control element 127 to final control element 172 and vice versa, as later to be described. If the valve 421 be partly closed, to provide flow restriction, then there is induced into the output pressure in line 419 a component proportional to the rate of change of steam temperature in line 120. The pressure in output line 419 is also applied by way of a valve or flow restriction 423 to a reset bellows 424 and capacity tank 426. As well understood by those skilled in the art, the provision of the reset bellows provides a component in the pressure of output line 419 which enables the system to maintain the controlled variable, as the steam temperature in line 120, at a predetermined value notwithstanding change in load on the steam generator 110 from a very low value to a high value or any other disturbance requiring variation in output loading pressure in output line 419. The result of the reset action due to bellows 424 is that the final control element, either damper 127 or valve 172, as the case may be, will be adjusted to an extent which will overcome the droop or offset which would otherwise be present in a simple proportional-position control system, with or without rate action.

In describing the operation of the system shown in Fig. 5, it will first be assumed that the steam generator 110 is operating under low-load conditions. As previously described in connection with Figs. 1 and 4, variation in the position of damper 127 will change the volume and temperature of the hot products of combustion entering the convection section 110a with maximum recirculation of the flue gases being obtained when the damper 127 is in its fully opened position. The rate of firing of the burners 111 will be under the action of the combustion control system previously described in connection with Figs. 1 and 4, and diagrammatically indicated by block 28, operating upon valve 29.

It will now be assumed that there has been a change in the rate of flow of combustion gases through the exit 110b as a result of a change in the boiler load. This change will immediately be detected by the tilting manometer 164 that is connected across the air preheater 65, even though there has been no change as yet in the output of thermocouple 175 in steam line 120. Thus, an anticipatory effect is provided in the control system for anticipating the change that would be called for by the control as a result of a change in temperature which would be detected by the thermocouple 175 if the steam temperature in line 120 changed immediately with change in rate of flow through the convection section 110a. This anticipatory effect is provided by the tilting manometer 164 which is similar to the tilting manometer 64 (Fig. 4) but instead of varying an electrical output signal varies a pneumatic output signal. The tilting manometer 164 includes a lever arm 165, pivoted at 164a. The outer end of lever arm 165 acts as a baffle for the nozzle 430 associated therewith. The nozzle is supplied with compressed air from a suitable source as by way of inlet line 431 having a valve restriction 432. The baffle 165 is adjusted relative to the open end of the nozzle 430 in accordance with the air pressure within a bellows 433 and in accordance with the movement of a body of fluid, such as the mercury 164b in the tilting manometer 164 suspended from the lever or baffle 165 on opposite sides of fulcrum 164a.

It will be assumed that there has been an increase in the boiler load thus increasing the pressure differenital across the air preheater 65 and causing the tilting manometer 164 to pivot in a counterclockwise direction, thereby moving the baffle 165 away from the end of nozzle 430. This change in position of the baffle 165 with respect to nozzle 430 will result in a change in pressure in bellows 433 in a direction opposing the movement of baffle 165. The change in pressure, in this case a reduction in pressure, is transmitted by way of lines 434 and 435, to an adjustable throttling valve 436, through an open port 437a in valve 437 through line 438 to the bellows 414 associated with booster 412. This reduction in pressure in bellows 414 causes lever 416 to rotate in a counterclockwise direction relative to its pivotal mounting at 417 under the influence of spring 418.

As will now be seen, the foregoing anticipatory action provided through the decreased pressure in bellows 414 will be in the same direction as the subsequent action taking place due to an increase in the steam temperature in output line 120. When the temperature of the steam in output line 120 increases, thermocouple 175 unbalances the measuring network 31 in a direction to actuate the gearing 404 by means of mechanical connection 403 to move baffle 405 toward the end of nozzle 406 in the pilot unit 407, thereby causing an increase in pressure in bellows 411 of the booster unit 412. It will be observed that bellows 411 is on the opposite side of the pivot 417 from bellows 414 and thus an increase in the pressure in bellows 411 will have a similar effect on the booster 412 as a decrease in pressure in bellows 414 from the anticipatory action, i. e., counterclockwise rotation of lever 416. The throttling valve 436 may be adjusted in accordance with the amount of anticipatory action desired.

At this time the damper 127 is under the control of the automatic control system. Accordingly, its proportional band setting, that is the angular position of nozzle 406 with respect to baffle 405 is under the control of the pneumatic cylinder 425 to which pressure is applied from a suitable supply through a regulator 440, through an adjustable throttling valve 441 and through the open port 442a of valve 442. The piston 425a is connected to the nozzle 406 and adjusts its angular position in accordance with the pressure applied to the pneumatic cylinder or actuator 425.

If the temperature of the steam in outlet, line 120, continues to rise, thereby increasing the pressure in bellows 411, as above described, there will be a resulting increase in pressure in bellows 413 and outlet line 419. This increased pressure will be transmitted from line 419 through valve 445, which is in its open position, to line 446. As line 446 is connected to actuator 400, its piston 401 will be moved in an upwardly direction against the bias of spring 402, thereby moving the cams 447 and 448 also in an upwardly direction, as they are carried by piston rod 401a. It will be observed that as cam 447 is raised the cam follower 447a, which is mechanically connected to damper 127 moves down the cam rise toward the lower flat portion 447b. When the cam follower 447a engages the flat portion 447b the damper 127 will have been moved to the fully closed position as will be visually indicated by the scale 200 and associated pointer 201. While the cam follower 447a was moving down the sloping portion of cam 447, the cam follower 448a mechanically connected to spray water valve 172 was moving along the flat-portion 448b of cam 448. As long as cam follower 448a engaged the flat portion 448b valve 172 remained in its closed position as visually indicated by scale 450 and the associated pointer 451. It will be observed that cams 447 and 448 are so constructed and arranged with respect to their associated cam followers 477a and 448a that when cam follower 447a leaves the sloping portion and moves onto the flat portion 447b, the cam follower 448a will move off of the flat portion 448b of cam 448 and onto the sloping portion thereof.

Simultaneously with the movement of cam followers 447a and 448a from one portion of their associated cams to the other, a cam 455 will have its rise 455a engage the cam follower 456 carried by a pivotal switch 457. Upon the foregoing engagement, switch 457 is actuated to the right, first closing contacts 458 and then closing contacts 459. When contacts 458 are closed the coil of relay 460 will be energized through the completion of an electrical circuit from one side of a source 461 through contacts 462, normally closed, and held in closed position by a time delay means, such as a dashpot 463, until a time interval after the coil of relay 460 has been energized. The circuit continues from contacts 462 by way of conductor 464, the operating coil of relay 460, conductor 465, contact 458 and by way of conductors 466 and 467 to the other side of supply 461. The relay 460 immediately moves its contact 470 to complete a holding circuit for its operating coil which holding circuit will be observed from inspection of the diagram. Contact 458 simultaneously completes an energizing circuit for the operating coil of relay 471 which thereupon moves its contacts 472 and 473 from their lowermost positions to their uppermost positions. Contact 472 maintains the existing value of the manipulated variables, i. e. the rate of flow of recirculated flue gas and the rate of flow of water in the desuperheater 118, by maintaining in fixed positions the damper 127 and the spray water valve 172. This is accomplished by sealing off the pressure in line 446 to pneumatic cylinder 400 through closure of valve 445 due to energization of its solenoid 445a by source 468 when contacts 472 were closed. As long as valve 445 remains closed the pressure in line 446 to pneumatic actuator 400 will remain constant. During this time interval there will be no movement of piston rod 401a and thus no resulting movement in either damper 127 or valve 172.

The timing of the operation of the various contacts is such that contacts 458 will close first followed by the closing of contacts 472, followed in turn by the closing of contacts 459 and 473. The stationary and movable portions of contacts 458 are so constructed that they may be closed prior to the closing of contacts 459 and the contacts 459 are of the type that will permit overtravel after closing as switch 457 moves to the right and thus permit the contacts 458 to open breaking the circuit through contacts 458 while maintaining closed the circuit through contacts 459. The stationary and movable portions of contacts 472 are so constructed to permit overtravel after closing by the actuating relay 471, thus permitting contacts 472 to close before contacts 473 are closed and upon the return stroke to permit contacts 473 to open before the opening of contacts 472. The reason for the foregoing sequence of operations will be apparent from the following description.

When contacts 459 are closed, the solenoid 475 will be energized by source 476 to move the valve stem in valve 442 to the left, closing port 442a and opening port 442b. This permits pressure to be applied from the supply through regulator 440 through adjustable throttling valve 477 through port 442b to the pneumatic cylinder 425. Since the valve 477 may be adjusted to a different position than valve 441, the nozzle 406 may in turn be moved to a new angular position relative to baffle 405, thereby providing a new proportional band to be utilized in connection with spray water valve 172 which will now be the final control element. The closing of contacts 459 also energizes the solenoid 480, connected in parallel with solenoid 475, whereupon the valve stem of valve 437 is moved downwardly closing port 437a and opening port 437b. Thus the flow connection between bellows 433 of the anticipatory device and bellows 414, associated with booster 412, will now be through line 434, line 481, adjustable throttling valve 482, port 437b and line 438. By utilizing a different throttling valve 482 instead of the throttling valve 436, it is now possible to provide a different amount of anticipatory action with the use of spray water valve 172, than previously utilized when damper 127 was the final control element. Both of valves 437 and 442 have bleed provisions.

When contacts 473 of relay 471 are closed, the solenoids 484 and 485 will be energized by source 476, thereupon opening valve 486, to permit a bypass around the rate valve 421 and opening valve 487 to provide a direct connection from reset bellows 424 through line 488 and valve 487 to nozzle 490, the latter being associated with a differential pressure responsive device 491 arranged to develop a control pressure which varies in magnitude in accordance with the difference in pressure between the output pressure in line 419 from booster 412 and the pressure in line 446 that has been temporarily sealed off from the remainder of the control system.

As above described the proportional band of the system has been changed resulting in a change in output pressure in line 419, leading to valve 445. If valve 445 were to be opened at this time, the control system would be upset since the pressure in output line 419 is not the same as the pressure in line 446. Accordingly, it is the purpose of the time delay device 463 to maintain valve 445 in closed position until there has been an equalization of the pressures in lines 419 and 446. This is accomplished in the following manner.

When the pressure changes in bellows 411 and 413, resulting in a changed pressure in line 419, this new pressure is transmitted through line 492 to chamber 493, the latter making up one of the two opposed pressure chambers 493 and 494 of device 491. The chambers 493 and 494 are separated by a diaphragm 495 which moves in response to any differential in pressure between the pressures in chambers 493 and 494. The movement of diaphragm 495 is transmitted by a rod 496 passing through the chambers 494 and 493 and through sealing diaphragms in the respective end walls of device 491.

As before stated, the pressure in lines 419 and 492 has changed with respect to the pressure sealed off in line 446 and thus the pressure in chamber 493 will be different than the pressure in chamber 494 as the latter is subjected to the same pressure as line 446 through line 497. Thus the rod 496 and diaphragm 495 will tend to move under the restraint of leaf spring 499 in a direction moving baffle 498 with respect to the end of nozzle 490. Nozzle 490, connected through a restriction 500 to an air supply regulator 503 in line 501, establishes a control pressure in line 502 inversely proportional to the amount of opening between nozzle 490 and baffle 498. Thus the control pressure in line 502 increases with decreased opening between nozzle 490 and baffle 498 and vice versa. The pressure in line 502 is continuously applied through valve 487, to line 488, and the reset bellows 424 during the time that valve 487 is held in open position through the energization of solenoid 485. Assuming that the pressure in chamber 493 is higher than the pressure in chamber 494, the baffle 498 will be moved away from nozzle 490 thus reducing the pressure through line 502, valve 487 and line 488 to the reset bellows 424. Reduced pressure in reset bellows 424 permits the baffle 405 to be moved away from nozzle 406 in the pilot unit 407, thus tending to reduce the pressure in line 408 to bellows 411 and 413, thereby resulting in a reduction in pressure in output line 419.

Accordingly, a reduction in the output pressure in line 419 will reduce the pressure in chamber 493, thereby decreasing the pressure differential between chambers 493 and 494 until the pressures in these two chambers are equal. Such equalization of pressures takes place within the system during the time interval that the contact 462 is held in closed position by the time delay device 463. When the time delay device 463 opens contact 462, the circuit to holding coil of relay 460 will be broken, thus deenergizing its holding coil and opening contacts 470. When contacts 470 are opened, the holding coil of relay 471 will be deenergized, thus opening the contacts 473 and 472 in that sequence. When contacts 473 are opened, the solenoids 484 and 485 are deenergized, thereby moving the corresponding valves 486 and 487 to closed position and closing the bypass around rate valve 421. When contacts 472 are opened, the solenoid 445a is deenergized, thus opening valve 445 to connect the output pressure in line 419 with line 446 leading to the pneumatic actuator 400. As the output pressure in line 419 has been equalized, during the foregoing operation, with the pressure that was sealed off in line 446, there will be no change in the position of nozzle 406 with respect to baffle 405 as the result of opening valve 445. Thus the transfer of the control from the operation of damper 127 as the final control element to the operation of spray water valve 172 as the final control element with the associated changes in proportional band and gas flow response adjustments is made without upsetting the control system.

With the spray water valve 172 now under the control of the system, an increase in output pressure in line 419 resulting from an increase in temperature in the steam in line 120 will cause further upward movement of actuator rod 401a resulting in an opening movement of spray water valve 172. Should the temperature in steam line 120 decrease, for example, from a decrease in load, the control system will automatically change back to place the damper 127 under the control of the system if the temperature decrease of the steam in line 120 is sufficient to require it.

A decrease in load in steam generator 110 will be detected by the tilting manometer 164 which will anticipate the decrease in steam temperature in line 120 that will follow. This anticipatory action will be transmitted to bellows 414 creating an increase in pressure therein which will tend to rotate the lever 416 in a clockwise direction about pivot 417. This will be in the same direction as the rotational effect that will be produced when the steam temperature in line 120 decreases thereby causing a decrease in pressure in bellows 411, resulting from the movement of baffle 405 away from the end of nozzle 406 in the pilot device 407. When the transfer point T₁, Fig. 3, is reached, the spray water valve 172 will have been moved to a closed position and the transfer will then be made to place the damper 127 under the control of the control system. This transfer takes place when the pressure in actuator 400 has been reduced sufficiently permitting the rod 401a to move cam follower 456 of transfer switch 457 off the rise 455a and causing the associated contacts 458 to close, followed by opening of contacts 459 and then the opening of contacts 458. When contacts 458 close, the coil of relay 460 is energized, closing the holding contacts 470 and also energizing the coil of relay 471. Relay 471 then actuates contacts 472 and 473 to a closing position in that order. When contacts 458 open after momentarily closing, they break one of the circuits to the coil of relay 460. However, the coil is not deenergized as it continues to remain energized through the holding circuit including contacts 470.

With the opening of contacts 459, the solenoids 475 and 480 are deenergized, thus returning the valves 442 and 437 to their original positions as shown in Fig. 5. This restores the proportional band setting of the pilot device 407 to the proportional band that it previously had when utilizing the damper 127 as the final control element. It also restores the valve 436 into the anticipatory control circuit and removes the effect of valve 482 from that circuit. With the closing of contacts 472 and 473 the pressure is again sealed off in line 446 and in actuator 400 during the time the pressures in the two chambers 493 and 494 of device 491 are equalized as previously described. These pressures will become equalized during the time interval that dashpot 463 is effective in holding contact 462 closed. When contact 462 is opened the coils of relays 460 and 471 will both be deenergized, thereby opening contacts 473 and 472 to restore the control system to the control of damper 127, in the same manner as described above.

Summarizing the foregoing, it will be seen that the controller adjustments can be changed automatically without producing any associated immediate disturbance of the manipulated variable. Also, a change in the magnitude and polarity of an input control signal can be made automatically without creating an associated disturbance. Finally, in the more complex embodiment of the invention both controller adjustments and input control signals may be changed automatically and concurrently without creating any disturbance of the system.

It is to be understood that pneumatic control may be utilized in Fig. 1 in place of the electrical control illustrated in manner similar to the pnuematic modification shown in Fig. 5 corresponding to the electrical control system of Fig. 4.

It shall be understood the invention is not limited to the specific arrangements shown and that changes and modifications may be made within the scope of the appended claims.

What is claimed is:

1. An automatic control system for maintaining the magnitude of a condition at a predetermined control point comprising condition varying means, means responsive to deviation of the condition from said control point for producing a signal proportional to said deviation for automatically operating said condition varying means in accordance with a predetermined functional relationship between actuation of said condition varying means and said deviation, means for automatically producing a change in said functional relationship, means operable independently of the value of said signal during said change to prevent operation of said condition varying means, and means for conditioning said system regardless of the value of said signal to accommodate said change in functional relationship in avoidance of any operation of said condition varying means immediately associated with said change in functional relationship.

2. An automatic control system for maintaining the magnitude of a condition at a predetermined control point comprising condition varying means for changing the value of a manipulated variable, means responsive to deviation of the condition from said control point for automatically operating said condition varying means in accordance with a predetermined proportional relation between the value of said manipulated variable and said deviation, means for automatically producing a change in said predetermined proportional relation, means operable during said change to prevent operation of said condition varying means, capacity means in said control system, and means for conditioning said capacity means to accommodate said change in predetermined proportional relation in avoidance of any operation of said condition varying means immediately associated with said change in said relation.

3. An automatic control system for maintaining the magnitude of a first condition at a predetermined control point comprising condition varying means, means operable upon deviation of the first condition from said control point for automatically operating said condition varying means, supplementary means for modifying operation of said second-named means in accordance with a predetermined relation to a second condition, means for automatically producing a change in said predetermined relation, means operable during said change to prevent operation of said condition varying means, and means to condition said system to accommodate said change in predetermined relation in avoidance of any operation of said condition varying means immediately assoicated with said change in said relation.

4. In a control system for applying a corrective action to a final control element in accordance with a predetermined relation, the combination of means operable through said system for automatically producing a change in the relationship, means for temporarily maintaining unchanged during said change in relationship the corrective action of said final control element and for establishing a temporary balance of said system corresponding with response thereof to said change, and means for thereafter restoring control of said final control element to said system.

5. In a control system for establishing a predetermined relationship between the corrective action of a final control element and the deviations of a controlled variable from a control point, the combination of means operable through said system for automatically producing a change in the relationship between the action of said final control element and the deviation of said controlled variable from said control point, means for temporarily maintaining unchanged during said change in relationship the corrective action of said final control element and for establishing a temporary balance of said system corresponding with said change, and means for thereafter restoring control of said final control element to said system.

6. In a control system having a balanceable network including a reset capacity for introducing reset action, the combination of means for varying the corrective action of a final control element with deviations of a controlled variable from a control point, comprising adjustable means in said network for predetermining a proportional response of the system, automatic means for temporarily maintaining unchanged the corrective action of said final control element and for concurrently producing a change in said adjustable means for establishment of a response of the system to a different proportional band, said change of said adjustable means establishing a temporary balance of said network corresponding with said different proportional band, and means operable after establishment of said temporary balance for restoring control of said final control element to said network operable in accordance with said different proportional band.

7. In an automatic controller including a balanceable system and establishing a predetermined corrective action of a final control element with deviations of a controlled variable from a control point, the combination of means operable automatically through said system for establishing a different corrective action of said final control element with deviations of said controlled variable from said control point, means for temporarily maintaining unchanged the corrective action of said final control element and for establishing a temporary balance of said system corresponding with said different corrective action, and means for thereafter restoring control of said final control element to said system.

8. An automatic control system for maintaining the magnitude of a condition at a predetermined control point comprising condition varying means, means responsive to deviation of the condition from said control point for automatically operating said condition varying means in accordance with a predetermined functional relationship, means for automatically producing a change in said functional relationship, means operable during said change to prevent operation of said condition varying means, capacity means in said control system, and means for conditioning said capacity means to accommodate said change in functional relationship in avoidance of any operation of said condition varying means immediately associated with said change in functional relationship.

9. In a balanceable control system of the type responding to variation in related conditions and controlling a condition varying element to maintain at least one of said conditions at a predetermined value, a first network producing a first control signal variable in accordance with said one of said conditions, a second network producing a second control signal variable in accordance with another of said conditions, said second network including as circuit elements a reset resistor, a reset capacitor, a rate capacitor and a rate resistor, means for operating said condition varying element in accordance with said first and second control signals as influenced by said circuit elements, circuit means connecting the output of said first and said second networks to said operating means, means for varying the relationship between said second control signal and said other condition, and automatic switching means to disconnect said operating means for the period of time during which said relationship is being varied, said switching means also being operable to connect said reset resistor and said rate capacitor directly across the output of said first network, said reset capacitor then having applied to it during said period voltages including a voltage corresponding to the new relationship between said second control signal and said other condition to prevent initial actuation of said condition varying element at the end of said period of disconnection as a result of said change in relationship.

10. In a control system, a pressure actuated control element responsive to the pressure applied thereto for controlling the magnitude of a first condition, a controller for producing a first pressure dependent on the magnitude of said first condition, said controller including a reset chamber, means for developing a second pressure related to the magnitude of a second condition, means for applying to said pressure actuated control element a pressure dependent upon said first and second pressures, means for automatically producing a change in the relationship between said second pressure and said second condition, means to disconnect said control element from said system for the period of time during which said change is made, and means operable during said disconnection to apply directly to said reset chamber a control pressure related to said change in avoidance of initial actuation of said control element at the end of said period of disconnection as a result of said change.

11. In a balanceable control system, the method of maintaining a controlled variable at a control point which comprises adjusting the magnitudes of a manipulated variable in directions to oppose change of the controlled variable from the control point and by amounts bearing a predetermined relationship to deviation of said variable from said control point, automatically changing in predetermined manner the relationship between change in magnitude of the manipulated variable with deviation of the controlled variable from the control point, prior to said change in said relationship preventing change of magnitude of said manipulated variable, temporarily balancing the control system, and after temporary balance thereof reestablishing change of said manipulated variable at said new relationship.

12. In a balanceable control system having a reset capacity introducing reset action for automatically adjusting the magnitude of a manipulated variable in accordance with a predetermined relationship with deviation of a controlled variable from a control point to maintain said controlled variable at said control point, the method which comprises predetremining at least one further and different relationship between change of the manipulated variable and deviation of the controlled variable from the control point, prior to transfer from one of said relationships to the other automatically carrying out the following steps: maintaining the final control element temporarily in fixed position, producing temporary balance of said system to correspond with the new relationship to be established between said manipulated variable and said deviation from the control point, and thereafter re-establishing control of said final control element by said system.

13. An automatic controller having a final control element determining the values of a manipulated variable, a balanceable system including a component for introducing in said system a system-unbalancing signal varying in direction and magnitude in accordance with the direction and extent of deviation of a controlled variable from a control point, said system having another component adjustable in direction to rebalance said system, means operable upon unbalance of said system for driving said adjustable component towards a system balancing position, automatically operated means associated with said system for abruptly changing the relationship between said unbalance of said system and said deviation, means effective during said abrupt change for temporarily maintaining the existing value of said manipulated variable, supplementary means associated with said system and operable while said manipulated variable is at said existing value for establishing temporary balance of said system, and means for thereafter restoring control of said final control element to said temporarily balanced system.

14. An automatic controller having a plurality of final control elements sequentially regulating the values of associated manipulated variables which affect a system condition, a balanceable system including a component for introducing in said system a system-unbalancing signal varying in direction and magnitude in accordance with the direction and extent of deviation of said system condition from a control point, said system having another component adjustable in direction to rebalance said system, means operable upon unbalance of said system for changing the value of one of said manipulated variables and simultaneously adjusting said rebalancing component, means associated with said system for abruptly changing the relative effect of said system-unbalancing signal upon said balanceable system, means effective during said abrupt unbalance for temporarily suspending the regulation of all said manipulated variables, supplementary means associated with said system and operable while said variables are at their existing values for establishing temporary balance of said system, and means for thereafter restoring control of at least one of said final control elements to said temporarily balanced system.

15. In a control system for regulating sequentially the supply of separate control agents and having a balanceable network which includes a reset capacity for introducing reset action, means for unbalancing said network with deviation of the controlled variable from a preset control point, a plurality of final control elements each associated with one of said separate control agents, said elements being moved individually in predetermined sequence in response to an unbalance of said network, means associated with said elements operable to rebalance said network in accordance with movement of said elements, the combination of automatic means for abruptly changing the relationship between said unbalancing means and said means to rebalance said network upon operation of one of said final control elements to a predetermined position, said means including switches for maintaining zero the output of said network, means for producing in said network a condition of temporary balance, and means for restoring operation of one of said final control elements under said control system for operation in accordance with said new relationship.

16. In a balanceable control system of the type responding to variation in related conditions and controlling a condition varying element to maintain at least one of said conditions at a predetermined value, a first network producing a first control signal variable in accordance with said one of said conditions, a second network producing a second control signal variable in accordance with another of said conditions, said second network including as circuit elements a reset resistor, a reset capacity, a rate capacity and a rate resistor, means for operating said condition varying element in accordance with said first and second control signals as influenced by said circuit elements, circuit means connecting the output of said first and said second networks to said operating means, means for varying the relationship between said second control signal and said other condition, and automatic switching means to disconnect said operating means for the period of time during which said relationship is being varied, said switching means also being operable to connect said reset resistor and said rate capacity directly across the output of said first network, and said reset capacity then having applied to it during said period, signals including a signal corresponding to the new relationship between said second control signal and said other condition to prevent initial actuation of said condition varying element at the end of said period of disconnection as a result of said change in relationship.

References Cited in the file of this patent
UNITED STATES PATENTS

| | | |
|---|---|---|
| 2,336,994 | MacKay | Dec. 14, 1943 |
| 2,580,512 | Broadbent et al. | Jan. 1, 1952 |
| 2,630,007 | Howe et al. | Mar. 3, 1953 |
| 2,657,347 | Bristol | Oct. 27, 1953 |
| 2,670,455 | Schuck | Feb. 23, 1954 |
| 2,692,356 | Milsom | Oct. 19, 1954 |
| 2,694,169 | Ehret | Nov. 9, 1954 |